United States Patent [19]
Stokes et al.

[11] Patent Number: 5,099,386
[45] Date of Patent: Mar. 24, 1992

[54] VARIABLE-CAPACITANCE POSITION TRANSDUCING

[75] Inventors: Brian P. Stokes, Windham, N.H.; Pierre Brosens, Belmont, Mass.; Stephen O'Dea, Wilmington, Mass.; Albert K. Bukys, Ashland, Mass.; Steven M. Burgarella, Framingham, Mass.; Jean I. Montagu, Brookline, Mass.

[73] Assignee: General Scanning, Inc., Watertown, Mass.

[21] Appl. No.: 698,867

[22] Filed: May 13, 1991

Related U.S. Application Data

[63] Continuation-in-part of Ser. No. 585,890, Sep. 20, 1990, abandoned.

[51] Int. Cl.$^5$ .................... H01G 5/06; G01R 27/26
[52] U.S. Cl. ..................................... 361/298; 324/725
[58] Field of Search .............. 361/298; 29/25.42; 335/229, 230; 318/662; 324/61 R

[56] References Cited

U.S. PATENT DOCUMENTS

| | | | |
|---|---|---|---|
| Re. 31,062 | 10/1982 | Burke, Jr. ............... | 335/229 |
| 2,461,832 | 2/1949 | Meacham ............... | 178/44 |
| 2,480,187 | 8/1949 | Gamertsfelder ........ | 321/51 |
| 2,534,505 | 12/1950 | Ergen ..................... | 318/25 |
| 2,719,192 | 9/1955 | Rex ......................... | 179/171 |
| 2,745,993 | 5/1956 | Foster .................... | 317/249 |
| 3,012,192 | 12/1961 | Lion ....................... | 324/57 |
| 3,238,623 | 3/1966 | Masel et al. ............ | 340/347 |
| 3,253,207 | 5/1966 | Jauch ...................... | 320/1 |
| 3,306,104 | 2/1967 | Corcoran ................ | 73/188 |
| 3,337,789 | 8/1967 | Ono et al. ............... | 321/24 |
| 3,421,371 | 1/1969 | Williams, Jr. .......... | 73/189 |
| 3,517,282 | 6/1970 | Miller ..................... | 317/249 |
| 3,577,072 | 5/1971 | Miller ..................... | 324/60 C |

(List continued on next page.)

OTHER PUBLICATIONS

Brochure, Fisher Torque Motors (1 page).
Laser Beam Scanning, 1985, pp. 82-91.
Alloca, John A., "Capacitive Transducers", Transducers, Theory and Application, Chapter 4, pp. 89-104, 1984.
Foldvari et al., "Capacitive Transducers", Instruments and Control Systems, Nov. 1964.
Jones, "The Design and Some Applications of Sensitive Capacitance Micrometers", Instruments and Experiences, 1988, pp. 219-239.
Lion, "Electrical Input-Transducers", Instrumentation in Scientific Research, 1959, pp. 66, 70.

*Primary Examiner*—Donald A. Griffin
*Attorney, Agent, or Firm*—Fish & Richardson

[57] ABSTRACT

A variable-capacitance transducer detects the angular position of a rotatable member. The transducer includes a first capacitance plate having a plurality of electrically conductive capacitance electrodes, a second capacitance plate spaced therefrom, and a dielectric element located between the plates. At least two of the electrodes are interconnected by a conductive trace. The dielectric element or one of the plates is fixedly mounted on the rotatable member. The electrodes on the first capacitance plate, in conjunction with the second capacitance plate, form a plurality of capacitances that vary as the angular position of the rotatable member changes. A conductive guard partially envelopes the conductive trace and a conductive guard partially envelopes the electrodes on the first capacitive plate. A spacer defines the distance between the capacitance plates and has a coefficient of thermal expansion and dimensions that cause the distance between the capacitance plates to vary by an amount calculated to compensate for changes in plate area with temperature. The transducer includes a parasitic capacitor plate having a position that is adjustable to compensate for parasitic capacitance. An electromagnetic shield is constructed and positioned, with respect to a driver that controls the rotatable member, such that the shield tends to prevent electromagnetic radiation from the driver from affecting the capacitances between the capacitance plates.

55 Claims, 8 Drawing Sheets

U.S. PATENT DOCUMENTS

| | | | |
|---|---|---|---|
| 3,727,137 | 4/1973 | Barron | 325/67 |
| 3,732,553 | 5/1973 | Hardway, Jr. | 340/200 |
| 3,775,678 | 11/1973 | Abbe | 324/60 C |
| 3,970,979 | 7/1976 | Montagu | 335/229 |
| 4,066,958 | 1/1978 | Burke, Jr. | 324/125 |
| 4,092,579 | 5/1978 | Weit | 318/662 |
| 4,110,879 | 9/1978 | Burke, Jr. | 29/25.42 |
| 4,142,144 | 2/1979 | Rohr | 324/61 R |
| 4,168,464 | 9/1979 | Colson et al. | 324/61 R |
| 4,177,421 | 12/1979 | Thornburg | 324/61 R |
| 4,189,699 | 2/1980 | Burke, Jr. | 335/229 |
| 4,234,139 | 11/1980 | Porchia | 242/191 |
| 4,238,781 | 12/1980 | Vercellotti et al. | 340/870.37 |
| 4,244,219 | 1/1981 | Takahaski | 73/309 |
| 4,247,796 | 1/1981 | Fiorentino et al. | 310/308 |
| 4,264,942 | 4/1981 | Iri et al. | 361/298 |
| 4,268,889 | 5/1981 | Wolfendale | 361/292 |
| 4,528,533 | 7/1985 | Montagu | 335/230 |
| 4,694,235 | 9/1987 | Flowers | 318/662 |
| 4,755,731 | 7/1988 | Anthony et al. | 318/662 |
| 4,864,295 | 9/1989 | Rohr | 340/870.37 |
| 4,867,560 | 9/1989 | Kunitsugu | 356/152 |

VARIABLE-CAPACITANCE POSITION TRANSDUCING

This application is a continuation-in-part of application Ser. No. 07/585,890 filed Sept. 20, 1990 and now abandoned.

BACKGROUND OF THE INVENTION

This invention relates to variable-capacitance position transducing. This is a continuation-in-part of U.S. patent application Ser. No. 07/585,890.

Variable-capacitance transducers typically include a stationary portion, such as a pair of capacitor plates, that is held as one frame of reference and a moving portion, such as a rotating dielectric located between the capacitor plates, that is held as the second frame of reference. Generally, such position sensors may be as accurate as a part in a thousand or even a part in a hundred thousand.

Variable-capacitance transducers are used primarily in closed-loop systems for precise positioning of rotatable elements of various mechanisms such as galvanometers, stepping motors, gimbals, gyros, and similar devices. In closed-loop systems, errors that are the result of motor and galvanometer non-linearities or external forces are monitored and corrected in order to improve accuracy of positioning. Position transducers in closed-loop systems produce information that is used to compensate for mechanical properties of motors, galvanometers, and other devices that could not be corrected in open-loop systems. Such transducers can alternatively be used in open-loop systems as a reporting system to report the orientation of a rotating member.

The desired movement of the rotatable element may be oscillatory or step-and-settle in nature. Variable-capacitance position transducers are also useful in holding rotatable elements accurately in a fixed position. For example, a rotating shaft may be used to deflect a mirror to a position at which a laser is incident on the mirror and at which the reflected beam in turn works upon a material or object, as occurs in microlithography, laser trimming of resistors in film resistor applications, repairing of memory circuits in silicon memory chips prior to packaging of the chips in final form, exposure of photosensitive films or papers, reprographic applications, or scanning of a field to report video information.

In a known variable-capacitance transducer, shown in FIG. 10, four electrode segments 82, 83, 84, and 85 are arranged cylindrically around a rotor 86. The four electrode segments are constructed as two pairs of segments, the two electrode segments in each pair being interconnected by a conductive ring 87 or 88. A conductive outer cylinder, consisting of guard plates 89 and 90 that attach to plate 1, is constructed around rings 87 and 88. The outer cylinder shields conductive rings 87 and 88 from stray capacitances with respect to external structures.

SUMMARY OF THE INVENTION

In one aspect, the invention provides a variable-capacitance transducer for detecting the angular position of a rotatable member. The transducer includes a first and a second capacitance plate, the plates being spaced apart from each other. The first capacitance plate includes a planar circuit board, the circuit board including two planar electrodes and a conductive trace interconnecting the electrodes. A dielectric element is located between the first and second capacitance plates. The dielectric element or one of the capacitance plates is fixedly mounted on the rotatable member. The first and second capacitance plates and the dielectric element are constructed in a manner such that the capacitance between the second capacitance plate and the interconnected electrodes on the first capacitance plate varies as the angular position of the rotatable member changes. The second capacitance plate and the interconnected electrodes are adapted for connection to a detector for measuring the capacitance between the second capacitance plate and the interconnected electrodes. The planar circuit board of the first capacitance plate further includes a conductive guard at least partially enveloping the conductive trace. The conductive guard, when driven at an electrical potential to electrically shield the trace, tends to prevent the trace from affecting the capacitance between the second capacitance plate and the interconnected electrodes on the first capacitance plate. By incorporating the electrodes, trace, and conductive guard all into a single, planar circuit board, the invention provides a compact design at low expense and with ease of fabrication.

In preferred embodiments, the first capacitance plate is located in a plane perpendicular to an axis of rotation of the rotatable member. The second capacitance plate is parallel to the first capacitance plate and spaced from the first capacitance plate along the axis of rotation. The dielectric element is located between the first and second capacitance plates along the axis of rotation. The dielectric element is fixedly mounted on the rotatable member, and the first and second capacitance plates are constructed to remain stationary as the rotatable member rotates. One of the plates is a ground plane on a housing that encloses the plates.

In another aspect of the invention, the first capacitance plate includes a plurality of electrically conductive capacitance electrodes. The electrodes on the first capacitance plate, in conjunction with the second capacitance plate, form a plurality of capacitances that vary as the angular position of the rotatable member changes. The transducer includes a conductive guard at least partially enveloping the electrodes on the first capacitance plate. The conductive guard includes a central portion, located within an interior space defined by the electrodes, and a band, located in an exterior space surrounding the electrodes. The guard, when driven at an electrical potential to electrically shield the electrodes, tends to reduce discontinuities in the electrostatic field at the edges of the electrodes.

In another aspect of the invention, the transducer includes a spacer defining the distance between the first and second capacitance plates. The spacer has a coefficient of thermal expansion and dimensions that cause the distance between the first and second capacitance plates to vary by an amount calculated to compensate for changes in plate area with temperature. The spacer may be a fixed portion of a housing enclosing the plates.

In another aspect of the invention, the transducer includes a parasitic capacitor plate. The position of the parasitic capacitor plate in the transducer is adjustable, in order to compensate for parasitic capacitance between parts of the variable-capacitance transducer. In preferred embodiments, the parasitic capacitor plate is mounted on the rotatable member, and the parasitic capacitor plate compensates for parasitic capacitance between the rotatable member and other parts of the transducer.

In another aspect of the invention, the transducer includes an electromagnetic shield. The shield is constructed and positioned, with respect to a driver that controls the rotatable member, in a manner such that the shield tends to prevent electromagnetic radiation from the driver from affecting the capacitance or capacitances between the plates as measured by the detector. In preferred embodiments, the electromagnetic shield includes a magnetically permeable material such as steel. The driver is located within a housing of non-magnetically permeable material. The shield is positioned between the driver on one side and the two capacitance plates and the detector on the other side. The shield at least partially envelops the plates and the detector. The detector includes demodulation circuitry for demodulating a high-frequency carrier that is applied to at least one of the capacitance plates, and the shield is constructed and positioned, with respect to the detector, in a manner such that the shield tends to prevent electromagnetic radiation from the driver from affecting operation of the detector.

The invention provides practical, substantially improved mechanisms for sensing rotational position based on electrostatic measurements. Position sensing mechanisms according to the invention achieve high accuracy in terms of linearity, repeatability, and thermal drift, and are as accurate as a part in a hundred thousand or a few parts per million. The invention minimizes electrical instabilities such as second order capacitive effects and parasitic capacitive effects that can make transducing difficult, and minimizes errors due to thermal expansion of capacitance electrodes. The electrical potential of the capacitive plates does not tend to be affected by other mechanical and electrical components, and therefore the invention reduces false changes in the sensor reading and false reports of angular change.

The high accuracy of the invention is useful, for example, in the semiconductor industry in making small trims and memory repairs in integrated circuits. The object to be trimmed can be in the one micron or one-half micron range. Thus, the target to be hit with the laser beam may have an outside diameter of about one-half micron. The invention helps in making integrated circuits as small as possible so that the distance between cells is reduced, enabling the circuits to operate faster and reducing the cost of fabrication.

Other advantages and features will become apparent from the following description of the preferred embodiment and from the claims.

DESCRIPTION OF THE PREFERRED EMBODIMENT

We first briefly describe the drawings.

DRAWINGS

STRUCTURE AND OPERATION

Figure 4:
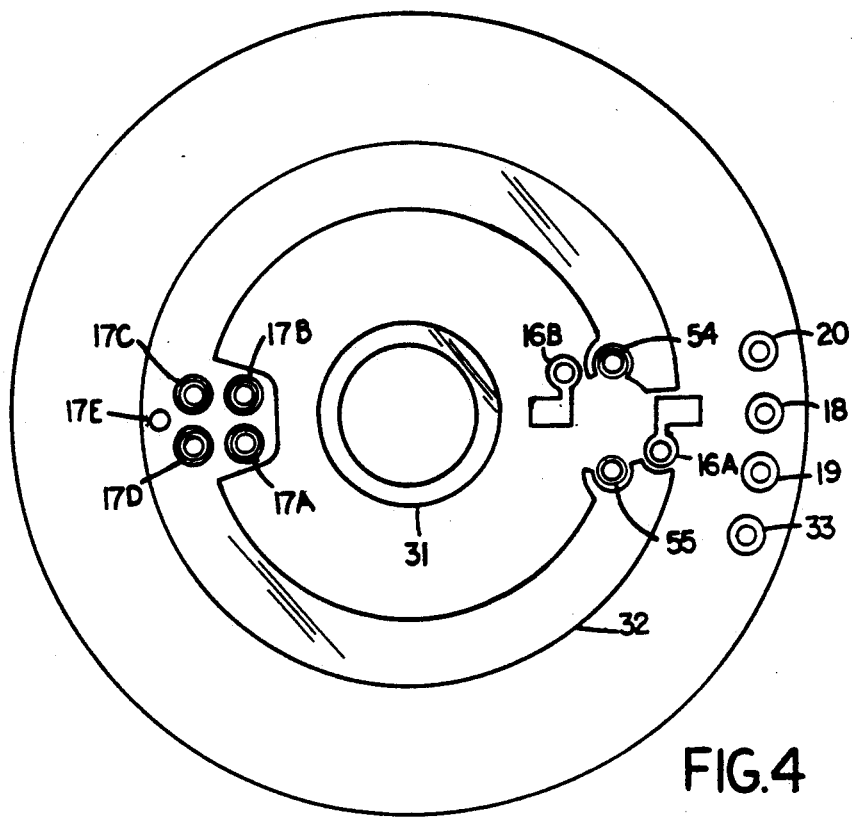
FIG. 4 is a view of the outside rear surface of the sensor plate.
Figure 5:
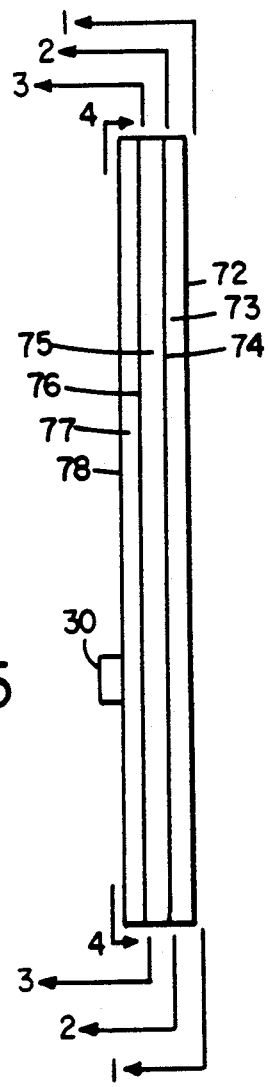
FIG. 5 is a side view of the sensor plate identify the circuit-board layers of FIGS. 1 through 4 as seen from the side.

Referring to FIG. 5, there is shown a drawing of a multi-layer circuit board that forms the electrode portion of a capacitive sensor. FIGS. 1 through 4, which show seven discrete layers of the multi-layer circuit board, are taken along lines 1—1 through 4—4 in FIG. 5. Layer 72, the outermost layer of the circuit board shown in FIG. 5, includes copper electrodes from which position signals are derived. Layer 72 has the construction shown in FIG. 1. Layer 73 is a layer of a fiberglass material commonly known as FR4, which is non-conductive and isolates layer 72 from layer 74. Layer 74 includes copper shielding and has the construction shown in FIG. 2. Layer 74 is electrically connected to layer 72 by feedthroughs that pass through non-conductive plastic layer 73. Layer 75 is a plastic layer identical to layer 73. Layer 76 is an interconnecting layer, and has the construction shown in FIG. 3. Layer 76 is electrically connected to both layers 74 and 72 by conductive feedthroughs that pass through plastic layers 73 and 75. Layer 77 is another plastic layer. Layer 78 includes copper shielding and has the construction shown in FIG. 4. Layer 78 is electrically connected to layers 72, 74 and 76 by electrical connectors that pass through plastic layers 73, 75, and 77.

Layers 72, 74, 76, and 78 are formed from plastic layers having a solid copper coating. The areas that are to remain coated with copper are photomasked, and the unmasked areas are chemically etched by caustic materials according to conventional circuit board fabrication techniques. The layers are aligned to one another during fabrication by aligning three targets on each mask with one another.

A package 30 of diodes is attached to layer 78. The diodes take the form of a hybrid circuit that is a small piece of ceramic, less than an eighth of an inch in diameter. The ceramic piece has four diodes attached to it and four conductive legs that project outward from the ceramic and that are soldered to make electrical connections between the diodes and conductive structures on the multi-layer circuit board.

Figure 1:
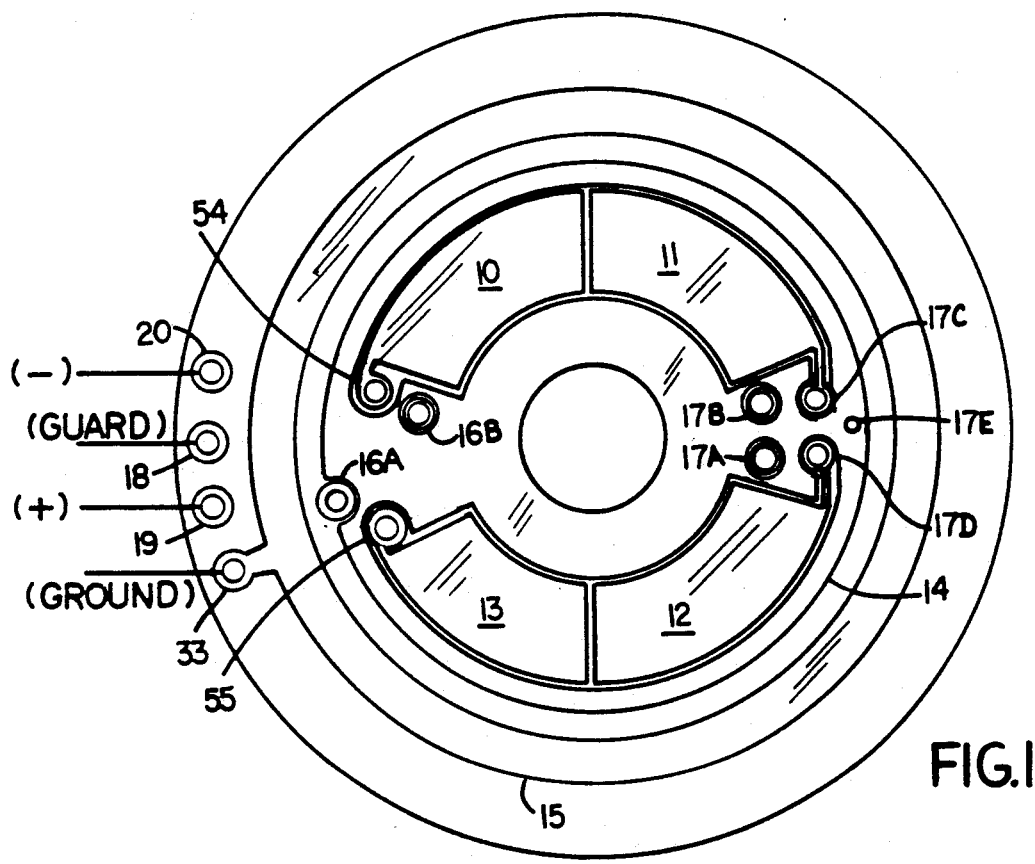
FIG. 1 is a view of the outside surface of a sensor plate of a transducer according to the invention.

Referring to FIG. 1, there is shown circuit-board layer 72 of plastic material on which copper is clad. The edge of the plastic material is shown by the outer circle in FIG. 1. In layer 72, copper electrode plates 10, 11, 12, and 13 form the sensing mechanism of the transducer. The electrodes are flat, thin, copper plates arranged in the form of circular crescents each subtending approximately 65 degrees. In a preferred embodiment each electrode plate has an outer diameter of 0.950 inch and an inner diameter of 0.550 inch. Plates 10 and 12 are electrically interconnected, as are plates 11 and 13, on layer 76 of the circuit board, as described below. Two other copper areas, 14 and 15, are isolated electrically from electrodes 10, 11, 12, and 13.

Element 14 takes the shape of a centrally located circle inside of crescents 10, 11, 12, and 13, the centrally located circle being connected to a continuation of area 14 that takes the shape of a ring outside electrodes 10, 11, 12, and 13, by a continuous copper bridge that passes between plates 11 and 12, and by a bridge that passes between plates 10 and 13. Plates 10, 11, 12, and 13 are electrically driven to a 200-volt AC potential, and separately, but at the same time, plate 14 is driven to a 200-volt AC potential in phase with plates 10, 11, 12, and 13, in order to ensure that the electrostatic field that is emitted by electrode plates 10, 11, 12, and 13 is not discontinuous at the edges of the electrodes and to maintain the field uniformly parallel away from the electrodes. Area 14 is called a driven guard. A grounded guard would cause the electrostatic field to be discontinuous at the ground. Instead, driven plate 14 is driven to the same potential as plates 10, 11, 12, and 13, so that there is no discontinuity in the field in the area around the plates. Errors that would ordinarily appear as non-linearities or sensitivities to translation are reduced or eliminated by the presence of the electrostatic field on plate 14. Plate 15 is a ground plate that is electrically connected to signal ground.

Plated feedthroughs (holes through the multi-layer circuit board plated with copper) 16A, 16B, 17A–17D, 18, 19, 20, 33, 54, and 55 enable differing signals to be taken off of the circuit board to go to other circuits or to be provided to the circuit board by other circuits. The feedthroughs are created by drilling holes through the circuit board, placing the circuit board in a bath of solution containing a copper compound, and raising the temperature of the bath while fluid flows through the holes, which causes copper to deposit on the internal surfaces of the holes.

Feedthroughs 17A–17D, 54, and 55 permit connection of plates 10, 11, 12, and 13 to layers 76 and 78 of the multi-layer circuit board. Feedthrough 33 provides a ground to plate 15. Feedthroughs 16A and 16B permit the attachment of diodes to the sensor, as explained below in conjunction with FIG. 4. Layer 72 is connected to layer 74 by feedthroughs 18, 19, 20, and 17E. Feedthrough 18 provides the guard voltage signal. Feedthroughs 19 and 20 provide "plus position" and "minus position" signals, i.e. the information the sensor is contrived to produce. Feedthrough 17E is a plated hole that connects element 14 on layer 72 to layer 74. Feedthrough 17E is electrically connected to feedthrough 18 on layer 74. Thus, feedthrough 18 is redundant. Feedthrough 17E is the primary interconnection between area 14 on layer 72 and the other layers.

A central hole in area 14 permits a shaft to pass through layer 72. In one embodiment the hole is slightly greater than ¼ inch in diameter, but the hole could be of any number of sizes to accommodate shafts of differing diameters. The central hole is drilled through the circuit board and plated with copper in the same manner as the feedthroughs.

Figure 2:
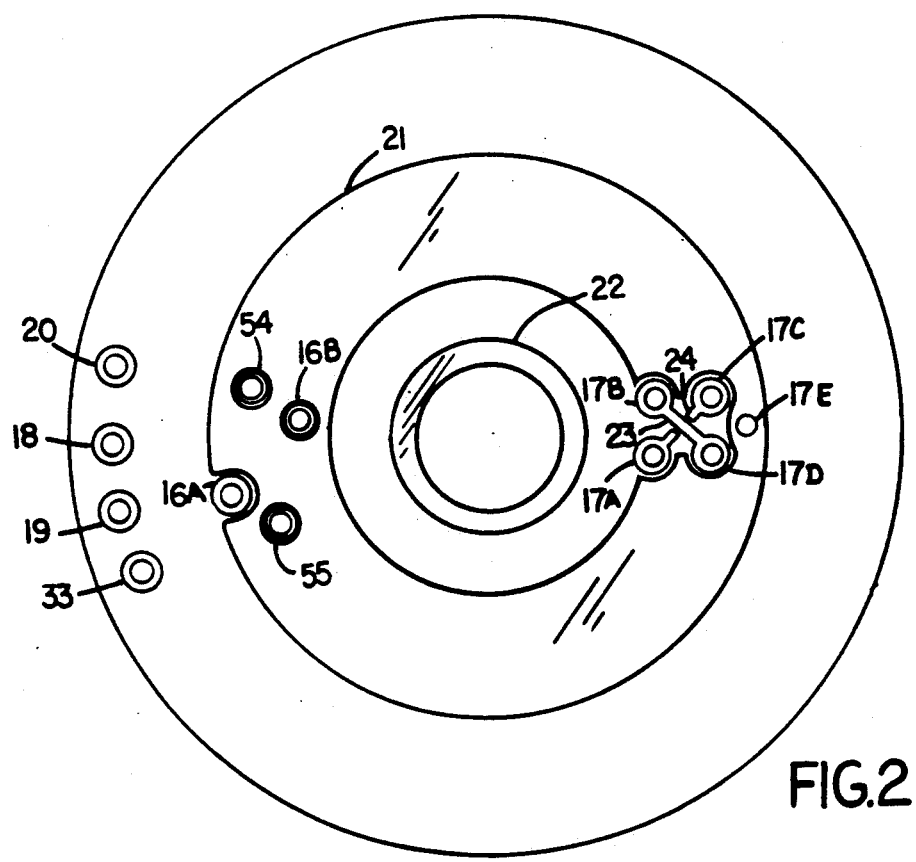
FIG. 2 is a view of an internal circuit-board layer of the sensor plate.

FIG. 2 shows layer 74 of the circuit board. Layer 74 includes a doughnut-shaped copper area 21, a centrally located circular plated ring 22 encircling the central hole that permits a shaft to pass through layer 74, and interconnection structure 23, which connects together feedthroughs 17B and 17D from FIG. 1. Interconnection structure 23 consists of a copper film. Broken interconnection structure 24 geometrically mimics interconnection of feedthroughs 17A and 17C without producing an electrical connection.

Plates 10 and 12 of layer 72 are interconnected on layer 76, as are plates 11 and 13. These interconnections are subject to stray capacitance. It is important that both of these interconnections have the same stray capacitance with respect to other objects in the sensor. Any stray capacitance will otherwise be misinterpreted as part of the signal in the rotational sensor. Mimicking device 24, shown in FIG. 2, minimizes the effect of stray capacitance on the signal. It approximates the same area of copper as interconnection structure 23, and provides symmetry, thereby enabling feedthroughs 17C and 17A, which are connected to plates 11 and 13 respectively, to have the same stray capacitance as feedthroughs 17B and 17D, which are connected to plates 10 and 12 respectively.

A large, doughnut-shaped area 21 on FIG. 2 is dimensioned in a manner such that it obscures the gaps between areas 10, 11, 12, 13, and 14 on FIG. 1. Area 21 is a driven guard that shields interconnection layer 74 from the outside world, and in particular from the exposure that would otherwise occur through the gaps on FIG. 1. Area 21 thereby shields the interconnection traces on layer 74, which connects elements 10, 11, 12, and 13 of layer 72 together in pairs, from capacitance with respect to the outside world. Area 22, which is electrically connected by the plated central hole to area 14 on FIG. 1, provides a conductive shield with respect to the shaft that rotates within the central hole.

Figure 3:
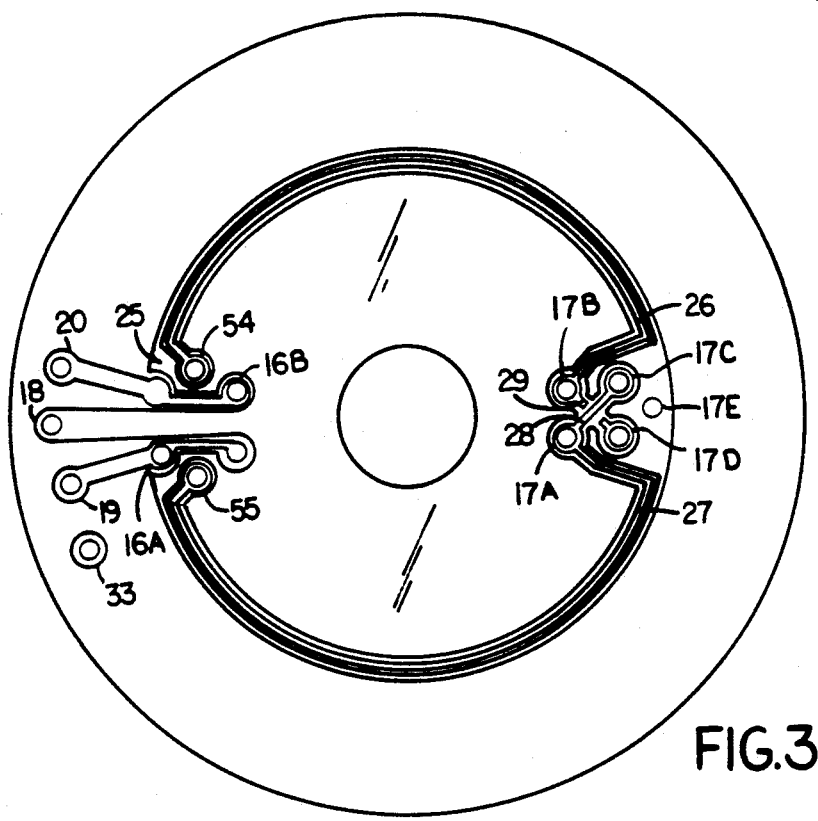
FIG. 3 is a view of another internal circuit-board layer of the sensor plate.

Referring to FIG. 3, interconnecting layer 76 of the circuit board provides all of the interconnection required for the various elements on the layers of the circuit board. Layer 76 includes a shielding area 25 that is electrically connected to feedthrough 18, from which a connection can be made off of the circuit board. Shielding area 25 includes a central hole that permits a shaft to pass through layer 76. Long semi-circular traces 26 and 27 form electrical connections between elements 10 and 12 and elements 11 and 13 respectively. Interconnection structure 28, which is similar to interconnection structure 23 shown on FIG. 2, provides an electrical connection between feedthroughs 17A and 17C. Broken interconnection structure 29 mimics the presence of element 28. Layer 76 also includes interconnections of the diode signals on feedthroughs 16A and 16B to feedthroughs 19 and 20.

FIG. 4 shows the outside surface of layer 78 of the circuit board. Feedthroughs 16A, 16B, 17A–17D, 18, 19, 20, 33, 54, and 55 terminate on layer 78, and it is from the outside surface of this layer that signals are taken off the assembled circuit board to other electronics. Layer 78 includes a circular shielding ring 31, having a central hole through it as on all the other layers, that is electrically connected by the plated central hole to the previously described guard 14 (FIG. ) and that acts as a shield with respect to the shaft that rotates within the central hole. A C-shaped ring 32 is electrically attached to guard 14 by feedthrough 17E. Feedthroughs 16A and 16B permit the attachment of diodes to the sensor. The square features that are connected to the circular plated holes of the feedthroughs provide a pair of locations at which a package of diodes is attached to the exposed exterior face of layer 72 and electrically connected to feedthroughs 16A and 16B. Two other terminals of the diode package are electrically connected to feedthroughs 54 and 55. Electrical current flowing to or from electrode plates 10, 11, 12, and 13 passes through the diodes to circuitry that measures the amount of electrical current flowing to or from the plates and through the diodes. The signals that arrive at feedthroughs 54 and 55 pass through the diode package to 16A and 16B and are conducted through layer 77 to conductive layer 76, where they are connected to feedthroughs 19 and 20, which enable the signals to be connected to other electronics.

The copper layers shown in FIGS. 1–4 are geometrically arranged to minimize the amount of misinformation produced by the transducer, thereby providing high linearity and repeatability of the transducer. For example, in FIG. 3 the semi-circular traces 26 and 27 that interconnect electrodes 10 and 12, and electrodes 11 and 13, are essentially extensions of the electrodes. Anything that changes the electrical potential between the traces and other elements would be interpreted as part of the signal, whereas the transducer ought to measure only the electrical potential between electrodes 10, 11, 12 and 13 and the other parts of the transducer. If the transducer were inadvertently to measure changes to the traces 26 and 27, an error would result that would decrease the linearity and repeatability of the transducer. Traces 26 and 27 are rendered insensitive by the geometry of a driven guard that includes shielding area 21 on FIG. 2, circular ring 32 on FIG. 4, and shielding area 25 on FIG. 3. The guard forms an envelope around connecting traces 26 and 27. Traces 26 and 27 are almost completely captured three-dimensionally within the guard. The guard is driven by an oscillator to the same potential as the electrodes 10, 11, 12, and 13, but is not physically part of the measurement circuitry as are electrodes 10, 11, 12, and 13. Electrostatic influences may affect the guard, and the guard may experience changes in capacitance with respect to other elements, but the guard prevents those influences from affecting traces 26 and 27.

The purpose of the guard 14 on FIG. 1 differs from the purpose of the guard on FIGS. 2, 3, and 4. Guard 14 prevents the discontinuities in the electrostatic field at the edges of electrodes 10, 11, 12, and 13 and maintains the field uniformly parallel away from the electrodes, thereby ensuring high linearity and repeatability of the transducer in a manner that is distinct from that of the three-dimensional guard surrounding traces 26 and 27.

Figure 6:
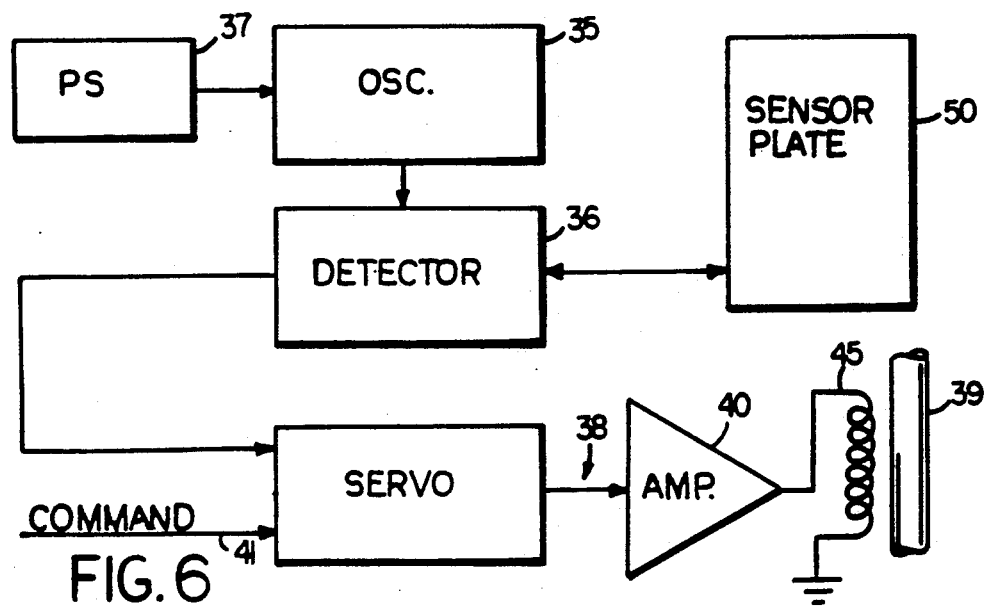
FIG. 6 is a block diagram of a transducer system according to the invention.

In order to derive a position signal from the device shown in FIGS. 1–5, it is necessary to connect electrically the device to an oscillator that generates an electrostatic field. Referring to FIG. 6, power supply 37 is connected to oscillator 35, which is in turn connected to detector circuit 36. Detector circuit 36 applies the signal from oscillator 35 to sensor plate 50 (the multi-layer printed circuit board shown in FIGS. 1–5), and produces an output current representing the capacitance between one pair of interconnected electrodes on sensor plate 50 and a ground plate minus the capacitance between the other pair of interconnected electrodes on sensor plate 50 and the same ground plate, which in turn represents the angular position of a rotatable shaft 39, as is explained in detail below. In typical use, the position signal is fed to a servoamplifier 38. Servoamplifier 38 uses the information contained in the position signal and the information contained in a command signal 41 specifying a desired angular position of shaft 39 to correct the position of rotating shaft 39 by means of amplifier 40 and motor coil 45. Shaft 39 may be a moving part of a closed-loop galvanometer such as the General Scanning Model G3B.

Figure 6A:
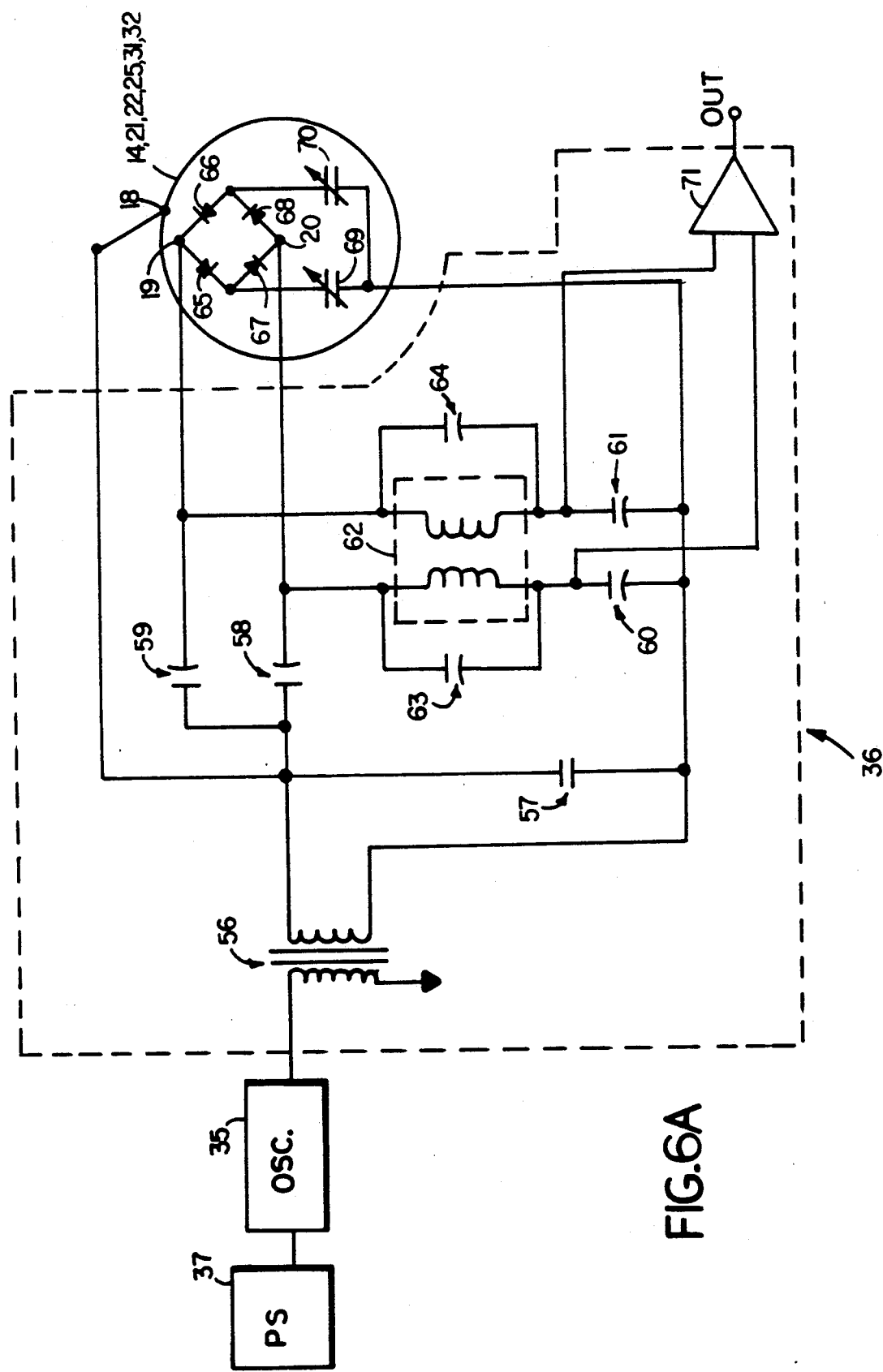
FIG. 6A is a circuit diagram showing in detail the detector circuit of FIG. 6.

Referring to FIG. 6A, detector circuit 36 includes a transformer 56 that receives the output of oscillator 35. A 22 pF capacitor 57 is connected across the secondary of transformer 56. One terminal of the secondary of transformer 56 is connected to guards 14, 21, 25, and 32 through electrical feedthrough 18, which is represented on the circuit diagram as a juncture point. This terminal is also connected, through capacitor 59, to feedthrough 19, represented as the juncture between diodes 65 and 66, and, through capacitor 58, to feedthrough 20, represented as the juncture between diodes 67 and 68. Diodes 65, 66, 67, and 68 of the diode bridge shown in FIG. 6A are located within the ceramic diode package 30 shown in FIG. 5. The other terminal of the secondary of transformer 56, which represents ground, is connected to a capacitance plate that faces layer 72 of the sensor plate shown in FIG. 5, and is connected to feedthrough 33 and grounded shield 15 shown in FIG. 1.

The juncture between diodes 65 and 67 is connected to capacitor 69, which represents the capacitance between interconnected electrodes 11 and 13 of FIG. 1 and the grounded plate facing the sensor plate. Likewise, the juncture between diodes 66 and 68 is connected to capacitor 70, which represents the capacitance between interconnected electrodes 10 and 12 of FIG. 1 and the grounded plate facing the sensor plate. The other two junctures of the diode bridge circuit are connected to a capacitive bridge circuit that includes 2200 pF capacitors 58, 59, 60, and 61. The capacitive bridge circuit is connected across the secondary of transformer 56, and the capacitive bridge circuit itself includes a transformer 62 as shown. 22 pF capacitors 63 and 64 are connected across the two coils of transformer 62. A differential amplifier 71 compares a signal at the juncture between capacitor 60 and transformer 62 with the signal at the juncture between capacitor 61 and transformer 62, and produces an output representative of the difference between these signals. The output signal of amplifier 71, which represents the difference between capacitance 69 and capacitance 70, is fed to servoamplifier 38 shown in FIG. 6.

Figure 7:
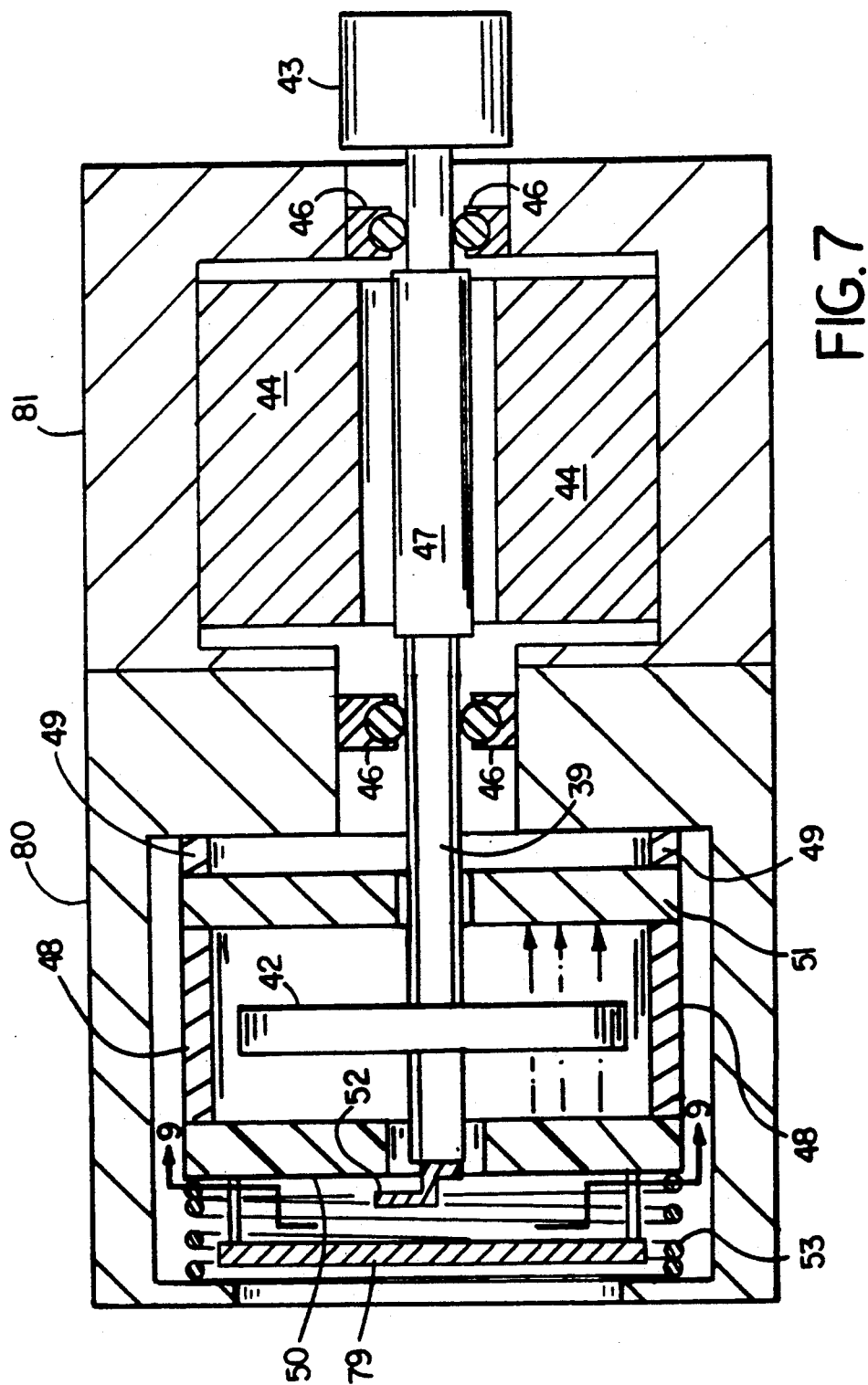
FIG. 7 is a cross-sectional drawing of a transducer according to the invention.

Referring to FIG. 7, sensor plate 50 encircles the tip of rotatable shaft 39. Shaft 39 is typically connected to a motor and also to a mirror for reflecting a light beam. Shaft 39 has mounted to it a piece of dielectric material 42 that rotates when shaft 39 rotates. Cylindrical spacer 48, which in a preferred embodiment has an outer diameter of 1.30 inch, an inner diameter of 1.14 inch, and a thickness of 0.080 inch, connects sensor plate 50 with grounded printed circuit board 51. Spacer 48 presses grounded plate 51 against a cylindrical shoulder or a boss 49 having approximately the same radial thickness as spacer 48, and a cylindrical spring 53 provides a retaining force against sensor plate 50. The oscillator circuitry (FIGS. 6 and 6A), located on circuit board disk 79, produces an electrostatic field between sensor plate 50 and grounded plate 51, which are separated from one another by approximately a tenth of an inch. Dielectric 42 moves in conjunction with shaft 39 between circuit boards 50 and 51. When shaft 39 rotates, the position of dielectric 42 changes, thereby changing the capacitance value between interconnected electrodes 10 and 12 and plate 51 and the capacitance value between interconnected electrodes 11 and 13 and plate 51. These changes in capacitance are reported by the detector circuitry (FIGS. 6 and 6A), which is located on circuit board disk 79. Every pair of capacitance values corresponds to an angular position of shaft 39. Shaft 39 is fixedly connected to mirror 43. A motor having a stator 44 that includes permanent magnets and a coil (coil 45 of FIG. 6) and having an iron rotor 47 that is mounted on shaft 39 causes the shaft to rotate. Shaft 39 is suspended by conventional ball bearings 46, which enable shaft 39 to be mounted within housing 49. It is important that ball bearings 46 be selected and installed in a manner to ensure that shaft 39 is held accurately and precisely in position.

The housing that surrounds the transducer and motor includes a magnetically permeable portion 80, preferably made of steel, that partially surrounds capacitor plates 50 and 51, dielectric element 42, and circuit board disk 79, and a non-magnetically permeable portion 81 that partially surrounds motor stator 44 and rotor 47. Magnetically permeable portion 80 serves as an electromagnetic shield that isolates the electrical components of the sensor from electromagnetic radiation from the motor. Because the signal that the oscillator circuit applies to the capacitor plates is a high-frequency signal, it can be shown through application of Maxwell's equations that the effect of electromagnetic coupling upon the measured capacitances between the plates would be insubstantial if the detector circuitry, which demodulates the high-frequency signal, were not in close proximity to the motor. Nevertheless, it can also be shown that the electromagnetic coupling does have a substantial effect upon the measured capacitances when detector circuitry in circuit board disk 79 is located close to the motor. In the preferred embodiment, circuit board disk 79 is approximately one-half inch from the motor. By eliminating perturbations caused by electromagnetic coupling, the magnetically permeable material eliminates the need to counteract the effect of coupling. Consequently, the transducer can operate at higher speed with an increased bandwidth. The portion 81 of the housing that surrounds the motor is made of non-magnetically permeable material, in order to ensure that the motor is not shorted.

Figure 9:
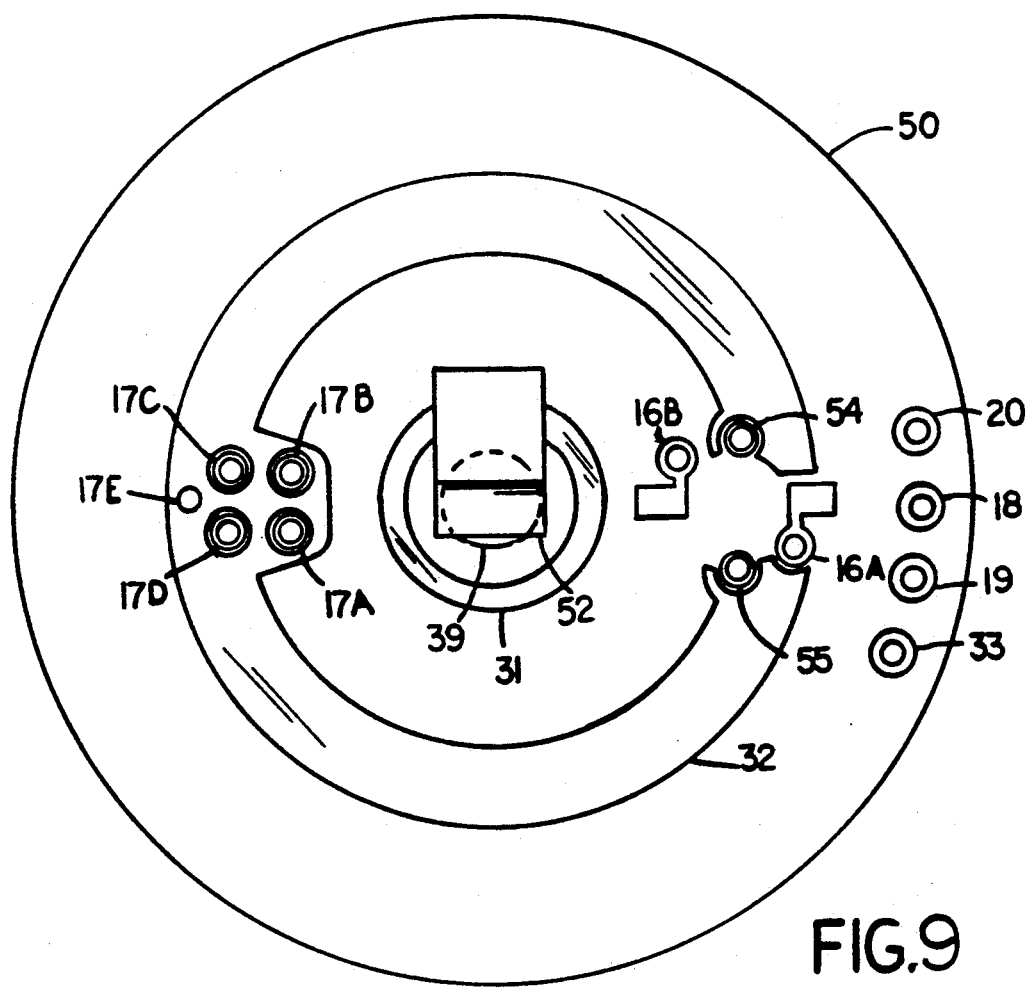
FIG. 9 is a view of the transducer shown in FIG. 7, taken along 9—9 in FIG. 7.
Figure 10:
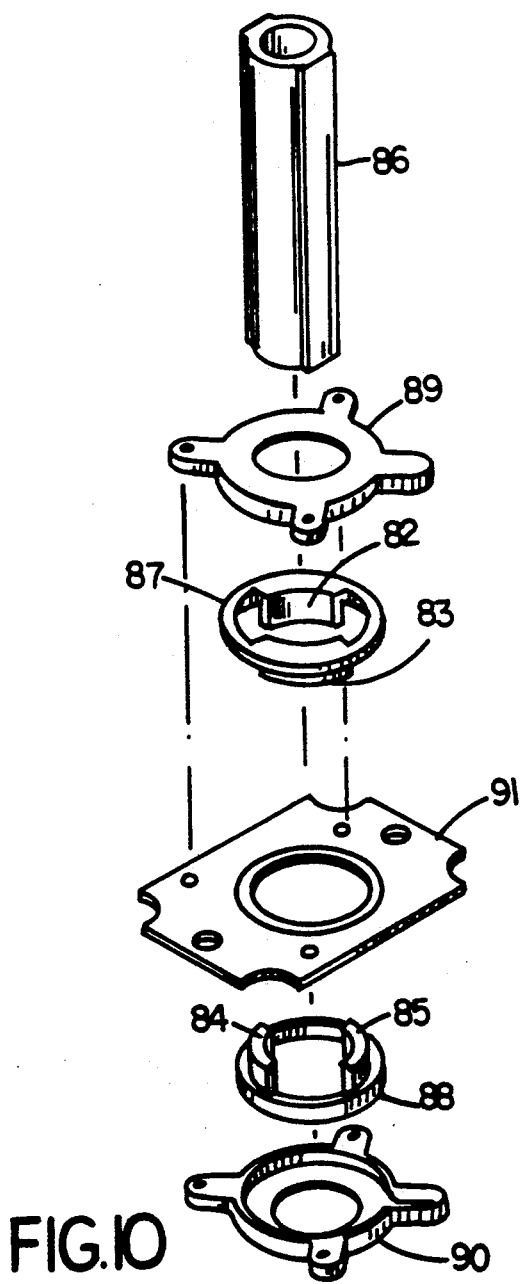
FIG. 10 is a view of a known transducer that includes a conductive outer cylinder that shields interconnected electrodes from stray capacitances

An adjustable parasitic capacitor plate 52 is mounted on the end of movable shaft 39, as shown in FIG. 7 and in FIG. 9, which shows a view of the transducer taken along line 9—9 in FIG. 7. Capacitor plate 52 resembles a flag that sticks out of the side of shaft 39. Capacitor plate 52 is rotatably adjustable with respect to shaft 39, and hence the path through which capacitor plate 52 moves when shaft 39 rotates is adjustable with respect to plates 50 and 51. Capacitor plate 52 provides compensation for parasitic capacitance between shaft 39 and plates 50 and 51, or between shaft 39 and any other part of the sensing mechanism. The linearity of the transducer can be adjusted by adjusting the position of parasitic capacitor plate 52 on shaft 39.

Figure 8:
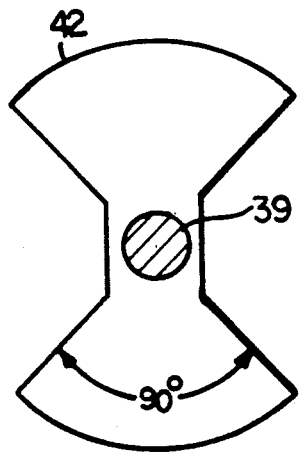
FIG. 8 is a view of the dielectric element of the transducer of FIG. 7.

FIG. 8 shows a preferred shape for dielectric 42, which resembles a bow tie or a circular disk that has had two of its quadrants removed. The non-truncated portions of the circular disk constitute segments of about 90 degrees. As dielectric 42 rotates the capacitance between one of the pairs of interconnected electrodes and the grounded plate increases while the capacitance between the other pair of interconnected electrodes and the grounded plate decreases. Recall that the detector circuit of FIG. 6A produces an output representative of the difference between these two capacitances.

The configuration of dielectric 42 in relation to the configuration of electrodes 10, 11, 12, and 13 prevents the position signal produced by the transducer from being polluted by non-rotational information such as non-rotational vibrations and microphonics. If the shaft or the capacitor plates translate in any direction other than that of rotation, the area of each interconnected pair of electrodes that is overlapped by dielectric 42 will tend to remain constant. Consequently, the sensor will not report the translation as a change in rotation, and the electronics that are coupled to the sensor will not attempt to compensate for that motion and thereby "create" an error, i.e. compensate for an error that is not in fact present. The configuration thus provides high linearity and repeatability of the transducer.

Dielectric 42 and shaft 39 may typically have an inertia of one gram centimeter squared, which is low for a sensor of this accuracy. The driven guard on FIG. 1 and the three-dimensional driven guard shown in FIGS. 2-4 enable the transducer to be extremely accurate in terms of linearity for transducers having similar inertia of moving parts. The accuracy of any sensor can be increased by providing moving parts that are heavier and have a larger inertia. Thus, the principles of the invention can be applied to higher inertia sensors to achieve even greater accuracy.

The driven guard of FIG. 1 and the driven guard shown in FIGS. 2-4 not only provide increased linearity, but also provide increased accuracy in terms of repeatability. Repeatability is the ability to place the shaft at a given angular orientation and measure the signal provided by the detector, then to move the shaft to a different angular position, and then to return to the original angular position and observe the same voltage from the detector. Repeatability is also provided by adjustable capacitor 52 shown in FIGS. 2 and 9, because if parasitic capacitances were to change, the voltages would be different even though the angular position is the same.

A third way in which the invention provides improved accuracy is in terms of thermal drift. Motion transducers have a tendency to change values when the ambient temperature is changed. The invention provides a device that is relatively insensitive to thermal drift. Copper electrodes 10, 11, 12 and 13, shown in FIG. 1, of sensor plate 50, shown in FIG. 7, grow in area in a radial plane with increasing temperature. Cylindrical spacer 48, constructed of an alloy of brass, connects sensor plate 50 with plate 51. When electrodes 10, 11, 12, and 13 increase in size the signal from the detector tends to increase. Spacer 48 moves electrodes 10, 11, 12, and 13 farther away from ground axially as temperature increases, which tends to decrease the signal from the detector. The dimensions and the coefficient of expansion of spacer 48 are chosen to cause sensor plate 50 to move away from ground plate 51 by an amount calculated to compensate for the increased area of sensor plate 50 that occurs when the temperature is increased, thereby preventing the signal from the detector from increasing as temperature increases, and resulting in the lowest possible thermal drift due to structures changing dimension. Thus, the behavior of sensor plate 50 with respect to temperature is balanced against the behavior with respect to temperature of the mechanical parts that hold sensor plate 50 in place, to provide a mechanical structure that is self-compensating for thermal drift.

Note that if electrodes 10, 11, 12, and 13 were constructed of a different material or with different dimensions, the coefficient of expansion or the dimensions of mechanical spacer 48 would have to be different. The relative effects of the growth of the plates in one axis and the growth of spacer ring 48 in a different axis can be determined by calculation, based upon a mathematical relationship, and verified empirically through laboratory experiments. The extent to which the calculated values do not exactly translate into actual electrode or spacer growth is a consequence of considerations that are not included in the mathematical calculation. For example, the copper electrodes do not grow as fast as calculated, because the substratum in which they have been laid tends to expand more than the copper, thereby stretching the copper.

In many structures, changes in detected position as a result of temperature are irregular and non-uniform, resulting in a staircase effect. I.e, the structure does not always return to its original configuration when it is restored to an original temperature. The structure of FIG. 7, in contrast, is implemented in a manner that freely permits movements caused by changes in temperature, and avoids binding or applying friction to parts that expand with temperature. Cylindrical spacer 48 presses grounded plate 51 against shoulder or boss 49, and a retaining force is provided against sensor plate 50 by spring 53. When spacer 48 expands or contracts axially, nothing binds it. Rather, the construction encourages spacer 48 to move axially in a linear, smooth manner that is predictable and repeatable. Thus, the structure described above is kinematically correct; i.e., it provides mechanical freedom that enables linear, uniform change in measurement with respect to temperature and that avoids the step problem or staircase effect.

The balanced mechanical structure reduces thermal drift in the output of the detector to the range of a hundred parts per million per degree C. Further compensation is provided by known electronic techniques to reduce thermal drift to the ten parts per million range. The electronic technique involves measuring temperature and making appropriate corrections in the signal from the detector. Thus, there are two levels of compensation.

Referring again to FIG. 7, it is noted that because the dielectric element 42 is placed behind the rear bearing, the first frequency of transverse (or cross-axis, or bending) resonance of the rotor and shaft assembly is increased. This is due to the fact that the position transducer does not occupy space between the bearings, so that portion of the shaft may be made shorter.

To demonstrate this advantage, consider that the resonance frequency $\omega_n$ of an ideal shaft suspended between two bearings is given by:

$$\omega_n = 9.87 \sqrt{\frac{EI}{\mu_1 l^4}}$$

where E is the modulus of elasticity of the shaft, I is its section inertia, l is the length of the shaft, and $\mu_1$ is the mass per unit length of the shaft (Source: Den Hartog, Mechanical Vibrations, 4th edition, McGraw-Hill Co., 1956, page 432). E, I and $\mu$ are determined by torque and magnetic considerations. It can be seen that the resonance frequency is inversely related to the second power of the length of the rotor, and therefore a decrease in the length of the shaft will cause a significant increase in the resonance frequency. This is advantageous because it allows the motor to be operated at a higher rate, improving output and/or the precision of its operations.

This geometry also allows for reduced rotor inertia, as a shorter rotor with the same transverse rigidity will have a lower diameter. This is particularly important in high-speed optical scanning galvanometers with moving iron rotors having low inertia values (e.g., under 7.5 gm·cm·cm) and high first cross-resonance frequencies (e.g., over 2 KHz). For example, a rotor with an inertia of 0.3 gm·cm·cm has been altered to increase its cross-axis resonance frequency of above 3 KHz by a factor of 1.9. A rotor with an inertia of 0.20 gm·cm·cm has been altered to increase its resonance frequency of above 7 KHz by a factor of 1.75.

It is noted that because the dielectric element of the invention is made of low density material, it contributes little to the inertia of the shaft-rotor assembly.

The above description has concentrated on position transducers that incorporate a floating ground. It is also possible to provide a transducer that is referenced to the motor housing, and achieve a reduced part count. An embodiment incorporating this feature is shown in FIG. 11, where elements similar to those in FIG. 7 are labeled with numbers ending in the same two digits.

Figure 11:
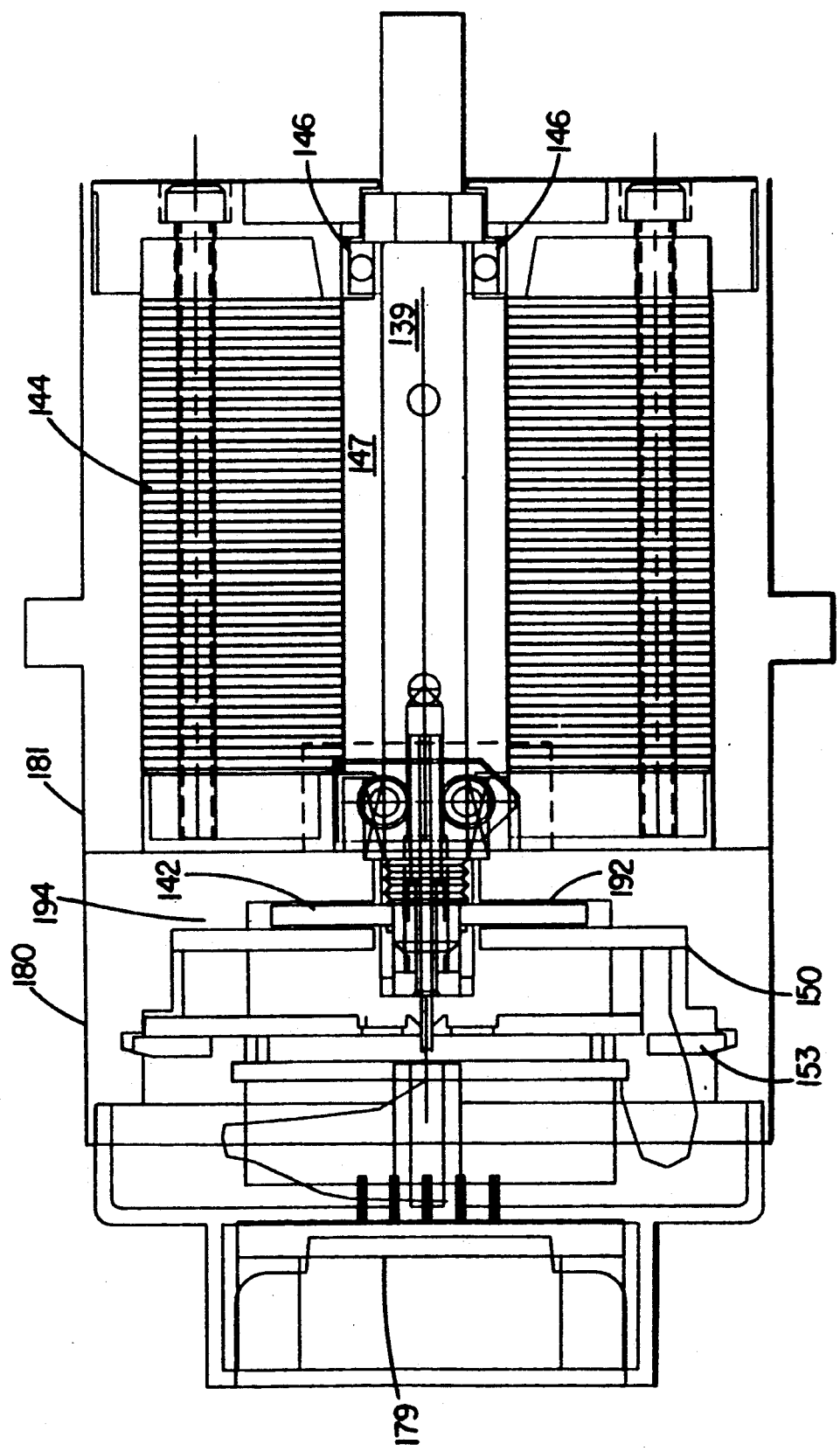
FIG. 11 is a cross section of an alternative motor and transducer according to the invention.

Referring to FIG. 11, the magnetically permeable portion 180 of the housing, which is grounded, includes a generally flat surface 192. During assembly, the dielectric element 142 is installed with one of its surfaces adjacent the grounded surface 192, and the sensor plate is loaded behind it, adjacent its other surface. The spring 153 holds the sensor plate firmly in place. With this configuration, the function of the floating grounded circuit board is replaced with the absolute grounded surface of the housing. The elimination of the grounded circuit board provides for a less expensive and more reliable transducer.

The embodiment of FIG. 11 is further advantageous in that the shoulder area 194 of the housing now performs the temperature compensation function previously performed by the spacer 148. This is a simplification of the design that may be achieved if the temperature coefficient of the material chosen for the magnetically permeable portion 180 of the housing is chosen to expand at a rate that compensates for the corresponding rate of expansion of the sensor plate. This also presents the advantage of a lower part count and therefore a less expensive and more reliable transducer.

Other embodiments are within the following claims. E.g., in many of the applications in which position sensors are used, such as in machine shop machinery, robotics applications, and space applications, it may be inconvenient to use a moving dielectric transducer, and consequently in a particular case a moving electrode transducer may be more practical. Moving electrode transducers ordinarily comprise two plates, one of which is held stationary while the other rotates in conjunction with a rotatable shaft. The "dielectric element" may simply be air or any other dielectric substance between the plates, and the term "dielectric element" as used in the claims includes within its scope air or other material between two plates of such a moving electrode transducer. Although a configuration having a moving dielectric is inherently less sensitive to shaft errors than a configuration in which one of the electrode plates is moving, the techniques described above can be applied to moving electrode transducers and be valuable in those contexts. For example, the feature of encapsulating traces within a three-dimensional guard could lead to an improvement of a transducer having moving electrodes. The technique of using a driven guard to maintain a uniformly parallel field away from an electrode would probably lead to an even greater improvement in accuracy of moving electrode transducers than would the feature of shielding the traces. The techniques and principles of the invention can also be applied to other variable-capacitance transducers, such as cylindrical transducers in which one of the "capacitance plates" as used in the claims is a cylinder within which a rotating element rotates. The cylinder may include electrodes interconnected by a conductive trace, the electrodes or the trace being shielded by a driven guard, the rotating element may include a parasitic capacitance plate, and the cylindrical transducer may include a temperature-compensating spacer.

What is claimed is:

1. A Variable-capacitance transducer for detecting the angular position of a rotatable member, said transducer comprising
    a first capacitance plate comprising a planar circuit board, said circuit board comprising two planar electrodes and a conductive trace interconnecting said planar electrodes,
    a second capacitance plate spaced from said first capacitance plate,
    a dielectric element located between said first and second capacitance plates,
    said dielectric element or one of said capacitance plates being fixedly mounted on said rotatable member,
    said first and second capacitance plates and said dielectric element being constructed in a manner such that the capacitance between said second capacitance plate and said interconnected electrodes on said first capacitance plate varies as said angular position of said rotatable member changes,
    said second capacitance plate and said interconnected electrodes being adapted for connection to a detector for measuring said capacitance between said second capacitance plate and said interconnected electrodes,
    said planar circuit board of said first capacitance plate further comprising a conductive guard at least partially enveloping said conductive trace.

2. A variable-capacitance transducer in accordance with claim 1 wherein
    said rotatable member is aligned along an axis of rotation, and
    said first capacitance plate is located in a plane perpendicular to said axis of rotation.

3. A variable-capacitance transducer in accordance with claim 2, wherein
    said second capacitance plate is parallel to said first capacitance plate and spaced from said first capacitance plate along said axis of rotation, and
    said dielectric element is located between said first and second capacitance plates along said axis of rotation.

4. A variable-capacitance transducer in accordance with claim 1 wherein said conductive guard substantially completely envelops said conductive trace.

5. A variable-capacitance transducer in accordance with claim 1, wherein
    said dielectric element is fixedly mounted on said rotatable member, and
    said first and second capacitance plates are constructed to remain stationary as said rotatable member rotates.

6. A variable-capacitance transducer in accordance with claim 1, wherein said conductive guard shields said conductive trace three-dimensionally.

7. A variable-capacitance transducer in accordance with claim 1, wherein
    there are at least two pairs of said electrodes,
    each said pair is interconnected by a conductive trace.

8. A variable-capacitance transducer in accordance with claim 1, wherein
    there are at least a first pair and a second pair of said electrodes,
    said first pair of electrodes is interconnected by a conductive structure that geometrically mimics a conductive structure interconnecting said second pair of electrodes.

9. A variable-capacitance transducer in accordance with claim 1, wherein
    said circuit board of said first capacitance plate comprises multiple layers,
    said electrodes are located in one layer of said circuit board, and
    said conductive trace and at least part of said conductive guard are located in at least one other layer of said circuit board.

10. A variable-capacitance transducer in accordance with claim 9, wherein said one layer of said circuit board in which said electrodes are located is a layer that is closest to said second capacitance plate.

11. A variable-capacitance transducer in accordance with claim 9, wherein
    there are at least a first pair and a second pair of said electrodes,
    said first pair of electrodes is interconnected by a first conductive trace,
    said second pair of electrodes is interconnected by a second conductive trace,
    an electrode in said first pair is connected to a first conductive feedthrough that is connected to a second conductive feedthrough by a first interconnection structure, the second feedthrough being connected to said first conductive trace,
    an electrode in said second pair is connected to a third conductive feedthrough that is connected to a fourth conductive feedthrough by a second interconnection structure, the second feedthrough being connected to said second conductive trace,
    said first and second feedthroughs are connected to a first broken interconnection structure that geometrically mimics said second interconnection structure, and
    said third and fourth feedthroughs are connected to a second broken interconnection structure that geometrically mimics said first interconnection structure 12. A variable-capacitance transducer in accordance with claim 1, wherein
    said first capacitance plate comprises at least two pairs of electrodes,
    each said pair of electrodes is interconnected by a conductive trace,
    said electrodes are arranged at differing circumferential positions on said first capacitance plate, each said pair of electrodes is interleaved with the other pair of electrodes on said first capacitance plate, and said conductive guard envelopes said conductive traces in order to prevent said traces from affecting said capacitance between said second capacitance plate and said interconnected electrodes on said first capacitance plate.

13. A variable-capacitance transducer in accordance with claim 12, wherein said first capacitance plate comprises a multi-layer circuit board, a first layer of said circuit board that is closest to said second capacitance plate comprises said electrodes, a second layer of said circuit board is a non-conductive layer, a third layer of said circuit board comprises a portion of said conductive guard that obscures gaps located between conductive portions of said first layer, a fourth layer of said circuit board is a non-conductive layer, a fifth layer of said circuit board comprises said conductive traces and a portion of said conductive guard enveloping said conductive traces, a sixth layer of said circuit board is a non-conductive layer, and a seventh layer of said circuit board comprises a portion of said conductive guard that obscures areas of said fifth layer in which said conductive traces are located.

14. A variable-capacitance transducer in accordance with claim 13, wherein there are two pairs of arcuate electrodes on said first layer, said portion of said conductive guard on said third layer is doughnut-shaped, said conductive traces on said fifth layer are semi-circular in shape, said portion of said conductive guard on said fifth layer comprises a central portion, located within an interior circumference of said conductive traces, and an annular band, located around an exterior circumference of said semi-circular traces, and said portion of said conductive guard on said seventh layer is annular in shape.

15. A variable-capacitance transducer in accordance with claim 13, wherein said two conductive traces on said fifth layer connect with said electrodes on said first layer by means of four conductive feedthroughs, said fifth layer comprises a conductive interconnection of a first pair of said conductive feedthroughs, and a structure that geometrically mimics interconnection of a second pair of said feedthroughs in order to mimic said conductive interconnection of said first pair of feedthroughs in terms of stray capacitance, and said third layer comprises a conductive interconnection of said second pair of feedthroughs, and a structure that geometrically mimics interconnection of said first pair of feedthroughs in order to mimic said conductive interconnection of said second pair of feedthroughs in terms of stray capacitance.

16. The transducer of claim 1 further comprising a housing enclosing said plates and said dielectric element, and wherein one of said plates is a ground plane on said housing.

17. A variable-capacitance transducer for detecting the angular position of a rotatable member, said transducer comprising, a first capacitance plate comprising a plurality of electrically conductive, capacitance electrodes, a second capacitance plate spaced from said first capacitance plate, a dielectric element located between said first and second capacitance plates, said dielectric element or one of said capacitance plates being fixedly mounted on said rotatable member, said first and second capacitance plates and said dielectric element being constructed in a manner such that said electrodes on said first capacitance plate, in conjunction with said second capacitance plate, form a plurality of capacitances that vary as said angular position of said rotatable member changes, said second capacitance plate and said electrodes being adapted for connection to a detector for measuring said capacitances between said second capacitance plate and said electrodes, said transducer further comprising a conductive guard at least partially enveloping said electrodes on said first capacitance plate, said conductive guard comprising a central portion, located within an interior space defined by said electrodes, and a band, located in an exterior space surrounding said electrodes.

18. A variable-capacitance transducer in accordance with claim 17 wherein each of said electrodes is arcuate in shape.

19. A variable-capacitance transducer in accordance with claim 17 wherein said rotatable member is aligned along an axis of rotation, and said first capacitance plate is located in a plane perpendicular to said axis of rotation.

20. A variable-capacitance transducer in accordance with claim 19, wherein said second capacitance plate is parallel to said first capacitance plate and spaced from said first capacitance plate along said axis of rotation, and said dielectric element is located between said first and second capacitance plates along said axis of rotation.

21. A variable-capacitance transducer in accordance with claim 17 wherein said conductive guard substantially completely envelopes said electrodes.

22. A variable-capacitance transducer in accordance with claim 17, wherein said dielectric element is fixedly mounted on said rotatable member, and said first and second capacitance plates are constructed to remain stationary as said rotatable member rotates.

23. A variable-capacitance transducer in accordance with claim 17, wherein said first capacitance plate comprises at least two pairs of electrodes, each said pair of electrodes is interconnected by a conductive trace, said electrodes are arranged at differing circumferential positions on said first capacitance plate, each said pair of electrodes is interleaved with the other pair of electrodes on said first capacitance plate, and said transducer further comprises a conductive guard at least partially enveloping said conductive traces.

24. A variable-capacitance transducer in accordance with claim 23, wherein
said first capacitance plate comprises a multi-layer circuit board,
a first layer of said circuit board that is closest to said second capacitance plate comprises said electrodes and said conductive guard enveloping said electrodes,
a second layer of said circuit board is a non-conductive layer,
a third layer of said circuit board comprises a portion of said conductive guard enveloping said traces, said portion obscuring gaps located between conductive portions of said first layer,
a fourth layer of said circuit board is a non-conductive layer,
a fifth layer of said circuit board comprises said conductive traces and a portion of said conductive guard enveloping said conductive traces,
a sixth layer of said circuit board is a non-conductive layer, and
a seventh layer of said circuit board comprises a portion of said conductive guard enveloping said traces, said portion obscuring areas of said fifth layer in which said conductive traces are located.

25. A variable-capacitance transducer for detecting the angular position of a rotatable member, said transducer comprising
a first capacitance plate comprising a planar circuit board, said circuit board comprising a plurality of planar electrodes and a conductive trace interconnecting at least two of said planar electrodes,
a second capacitance plate spaced from said first capacitance plate,
a dielectric element located between said first and second capacitance plates,
said dielectric element or one of said capacitance plates being fixedly mounted on said rotatable member,
said first and second capacitance plates and said dielectric element being constructed in a manner such that said electrodes on said first capacitance plate, in conjunction with said second capacitance plate, form a plurality of capacitances that vary as said angular position of said rotatable member changes,
said second capacitance plate and said electrodes being adapted for connection to a detector for measuring said capacitances between said second capacitance plate and said electrodes,
said planar circuit board of said first capacitance plate further comprising a conductive guard at least partially enveloping said planar electrodes, and a conductive guard at least partially enveloping said conductive trace to electrically shield said trace.

26. A variable-capacitance transducer for detecting the angular position of a rotatable member, said transducer comprising
a first capacitance plate,
a second capacitance plate spaced from said first capacitance plate,
a dielectric element located between said first and second capacitance plates,
said dielectric element or one of said capacitance plates being fixedly mounted on said rotatable member,
said first and second capacitance plates and said dielectric element being constructed in a manner such that a capacitance between said first and second capacitance plates varies as said angular position of said rotatable member changes,
said first and second capacitance plates being adapted for connection to a detector for measuring said capacitance between said first and second capacitance plates,
said transducer further comprising a spacer defining the distance between said first and second capacitance plates, said spacer having a coefficient of thermal expansion and dimensions that cause the distance between said first and second capacitance plates to vary by an amount calculated to compensate for changes in plate area with temperature.

27. A variable-capacitance transducer in accordance with claim 26 wherein
said rotatable member is aligned along an axis of rotation,
said first capacitance plate is located in a plane perpendicular to said axis of rotation,
said second capacitance plate is parallel to said first capacitance plate and spaced from said first capacitance plate along said axis of rotation, and
said dielectric element is located between said first and second capacitance plates along said axis of rotation.

28. A variable-capacitance transducer in accordance with claim 26, wherein
said dielectric element is fixedly mounted on said rotatable member,
said first capacitance plate is a multi-layer circuit board comprising a plurality of planar, electrically conductive capacitance electrodes, and
said first and second capacitance plates are constructed to remain stationary as said rotatable member rotates.

29. A variable-capacitance transducer in accordance with claim 26, wherein said spacer is a cylinder centered about said axis of rotation.

30. A Variable-capacitance transducer in accordance with claim 26, further comprising a linearization structure that ensures mechanical freedom of expansion and contraction of said spacer, thereby maintaining linearity of expansion and repeatability of expansion.

31. A variable-capacitance transducer in accordance with claim 30, wherein said linearization structure comprises a boss upon which an external face of said second capacitance plate rests and a spring that provides a retaining force against an external face of said first capacitance plate.

32. A variable-capacitance transducer in accordance with claim 26, wherein
said first capacitance plate comprises a plurality of planar, copper capacitance electrodes, and
said spacer is constructed of an alloy of brass.

33. A variable-capacitance transducer in accordance with claim 26, further comprising an electrical circuit that compensates for thermal drift of said variable-capacitance transducer in addition to compensation for thermal drift provided by said spacer.

34. The transducer of claim 26 further comprising a housing enclosing said plates and said dielectric element, and wherein said spacer is a fixed portion of said housing.

35. The transducer of claim 34 further comprising a housing enclosing said plates and said dielectric element, and wherein one of said plates is a ground plane on said housing.

36. A Variable-capacitance transducer for detecting the angular position of a rotatable member, said transducer comprising
   a first capacitance plate,
   a second capacitance plate spaced from said first capacitance plate,
   a dielectric element located between said first and second capacitance plates,
   said dielectric element or one of said capacitance plates being fixedly mounted on said rotatable member,
   said first and second capacitance plates and said dielectric element being constructed in a manner such that a capacitance between said first and second capacitance plates varies as said angular position of said rotatable member changes,
   said first and second capacitance plates being adapted for connection to a detector for measuring said capacitance between said first and second capacitance plates,
   said transducer further comprising an adjustable parasitic capacitor plate, the position of said adjustable parasitic capacitor plate in said transducer being adjustable in order to compensate for parasitic capacitance between a plurality of parts of said variable-capacitance transducer.

37. A variable-capacitance transducer in accordance with claim 36 wherein
   said rotatable member is aligned along an axis of rotation,
   said first capacitance plate is located in a plane perpendicular to said axis of rotation,
   said second capacitance plate is parallel to said first capacitance plate and spaced from said first capacitance plate along said axis of rotation, and
   said dielectric element is located between said first and second capacitance plates along said axis of rotation.

38. A variable-capacitance transducer in accordance with claim 36, wherein
   said adjustable parasitic capacitor plate is mounted on said rotatable member, and
   the position of said adjustable parasitic capacitor on said rotatable member is adjustable in order to compensate for parasitic capacitance between said rotatable member and other parts of said variable-capacitance transducer.

39. A variable-capacitance transducer in accordance with claim 36, wherein
   said dielectric element is fixedly mounted on said rotatable member, and
   said first and second capacitance plates are constructed to remain stationary as said rotatable member rotates.

40. A variable-capacitance transducer in accordance with claim 36, wherein
   said parasitic capacitor plate comprises an L-shaped flag mounted on an end of said rotatable member and extending over a portion of an external face of said first capacitance plate, and said position of said parasitic capacitor plate with respect to said rotatable member is adjustable about said axis of rotation.

41. A variable-capacitance transducer for detecting the angular position of a rotatable member controlled by a driver, said transducer comprising
   a first capacitance plate,
   a second capacitance plate,
   a dielectric element located between said first and second capacitance plates,
   said dielectric element or one of said capacitance plates being fixedly mounted on said rotatable member,
   said first and second capacitance plates and said dielectric element being constructed in a manner such that the capacitance between said first and second capacitance plates varies as said angular position of said rotatable member changes,
   said first and second capacitance plates being adapted for connection to a detector for measuring said capacitance between said second capacitance plate and said interconnected electrodes,
   said transducer further comprising an electromagnetic shield constructed and positioned with respect to said driver in a manner such that said electromagnetic shield tends to prevent electromagnetic radiation from said driver from affecting said capacitance between said first and second capacitance plates as measured by said detector.

42. A variable-capacitance transducer in accordance with claim 41 wherein
   said rotatable member is aligned along an axis of rotation,
   said first capacitance plate is located in a plane perpendicular to said axis of rotation,
   said second capacitance plate is parallel to said first capacitance plate and spaced from said first capacitance plate along said axis of rotation, and
   said dielectric element is located between said first and second capacitance plates along said axis of rotation.

43. A Variable-capacitance transducer in accordance with claim 41, wherein
   said electromagnetic shield is positioned between said driver and said detector.

44. A variable-capacitance transducer in accordance with claim 43, wherein
   said electromagnetic shield at least partially envelops said detector.

45. A variable-capacitance transducer in accordance with claim 41, wherein
   said electromagnetic shield is constructed and positioned with respect to said detector in a manner such that said electromagnetic shield tends to prevent electromagnetic radiation from said driver from affecting operation of said detector.

46. A variable-capacitance transducer in accordance with claim 45, wherein said detector comprises demodulation circuitry for demodulating a high-frequency carrier that is applied to at least one of said first and second capacitance plates.

47. A variable-capacitance transducer in accordance with claim 41 wherein said electromagnetic shield is positioned between said driver and said capacitance plates.

48. A variable-capacitance transducer in accordance with claim 47 wherein said electromagnetic shield at least partially envelops said capacitance plates.

49. A variable-capacitance transducer in accordance with claim 41 wherein said electromagnetic shield comprises a magnetically permeable material.

50. A variable-capacitance transducer in accordance with claim 49 wherein said driver is located within a housing of non-magnetically permeable material 51. A variable-capacitance transducer in accordance with claim 49 wherein said magnetically permeable material is steel.

52. A high performance moving iron scanning galvanometer for driving an optical element at frequencies substantially greater than 2 Khz, comprising a galvanometer housing, front and rear axially aligned bearings mounted on said housing, a moving iron rotor located within said housing between the bearings, with front and rear ends adjacent to said front and rear bearings, respectively, an output shaft connected to said front end of said rotor, supported by said front bearing, and extending beyond said front bearing sufficiently to provide mounting for the optical element, a rear shaft connected to said rotor at said rear end and supported by said rear bearing, and a low inertia capacitive position indicating element for providing indication of the instantaneous rotational position of said rotor and mounted on a portion of said rear shaft disposed outwardly of said rear bearing, i.e. on the side of said bearing opposite from said rotor, and fixed transducer means positioned in cooperative relationship with said position indicating element for velocity of said shaft, the overall inertia of the rotating portions of said galvanometer excluding the optical element being below 7.5 g.cm$^2$, the low inertia of said capacitive position indicating element and its location on the shaft portion outward of the space between said bearings enabling maximization of the first cross-axis resonant frequency of said galvanometer to a frequency substantially higher than 2 KHz.

53. The galvanometer of claim 52 wherein said position sensing element is a dielectric element.

54. The galvanometer of claim 52 wherein said position sensing element is a capacitive plate.

55. The galvanometer of claim 52 wherein said position sensing element has an inertia at least as low as about one gm·cm$^2$.

* * * * *

UNITED STATES PATENT AND TRADEMARK OFFICE
CERTIFICATE OF CORRECTION

PATENT NO. : 5,099,386
DATED : March 24, 1992
INVENTOR(S) : Brian P. Stokes, et al It is certified that error appears in the above-identified patent and that said Letters Patent is hereby corrected as shown below:

Col. 3, line 66, "identify" should be --identifying--;

Col. 4, line 10, after "along" insert --line--;

Col. 4, line 13, after "capacitances" insert a period;

Col. 6, line 36, "!8" should be --18--;

Col. 6, line 57, "(FIG.)" should be --(FIG. 1)--;

Col. 8, line 66, "!3" should be --13--;

Col. 21, claim 50, line 6, after "material" insert a period.

Col. 22, claim 52, line 9, after "for" insert --producing signals representing the rotational position or--.

Signed and Sealed this

Tenth Day of August, 1993

Attest:

MICHAEL K. KIRK

*Attesting Officer*    Acting Commissioner of Patents and Trademarks